(12) United States Patent
Zarpas et al.

(10) Patent No.: US 12,688,038 B2
(45) Date of Patent: Jul. 21, 2026

(54) SCALABLE CONVERSATIONAL EXPERIENCE FOR CITIZEN DEVELOPERS FOR BUILD AUTOMATION GENERATION

(71) Applicant: SAP SE, Walldorf (DE)

(72) Inventors: Emmanuel Zarpas, Paris (FR); Alexandre Fortin, Paris (FR)

(73) Assignee: SAP SE, Walldorf (DE)

( * ) Notice: Subject to any disclaimer, the term of this patent is extended or adjusted under 35 U.S.C. 154(b) by 259 days.

(21) Appl. No.: 18/357,620

(22) Filed: Jul. 24, 2023

(65) Prior Publication Data

US 2025/0036405 A1     Jan. 30, 2025

(51) Int. Cl.
*G06F 8/77* (2018.01)
*G06N 5/022* (2023.01)

(52) U.S. Cl.
CPC .............. *G06F 8/77* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 2014/0156282 A1* | 6/2014 | Madere | G06F 40/30 704/275 |
| 2019/0132264 A1* | 5/2019 | Jafar Ali | G06F 40/295 |
| 2022/0130380 A1* | 4/2022 | Touati | G06F 8/30 |
| 2022/0308918 A1* | 9/2022 | Pandey | G06F 8/30 |
| 2024/0403086 A1* | 12/2024 | Mancuso | G06N 3/042 |

OTHER PUBLICATIONS

Desmond, M., Duesterwald, E., Isahagian, V and Muthusamy, V., "A No Code Low-Code Paradigm for Authoring Business Automations Using Natural Language," Jul. 15, 2022, arXiv:2207.10648v1 [cs.CL]. (Year: 2022).*

* cited by examiner

*Primary Examiner* — Andrew M. Lyons
(74) *Attorney, Agent, or Firm* — Fish & Richardson P.C.

(57) ABSTRACT

Method and systems can provide a scalable conversational experience for citizen developers for build automation generation. A knowledge graph is identified that represents entities, entity attributes, and entity relationships of entities used in application programming interfaces of an enterprise software system. A natural language model is generated based on information in the knowledge graph and a chatbot is configured with the natural language model to generate automations for automating enterprise processes in the enterprise software system. Chatbot logic is generated based on information in the knowledge graph. The chatbot participates in a conversation with a user of the enterprise software system and the chatbot determines, from the conversation, using the natural language model, parameters of a requested automation for automating a process of the enterprise software system. The chatbot provides the determined parameters to an automation tool for creation of the automation.

20 Claims, 5 Drawing Sheets

100

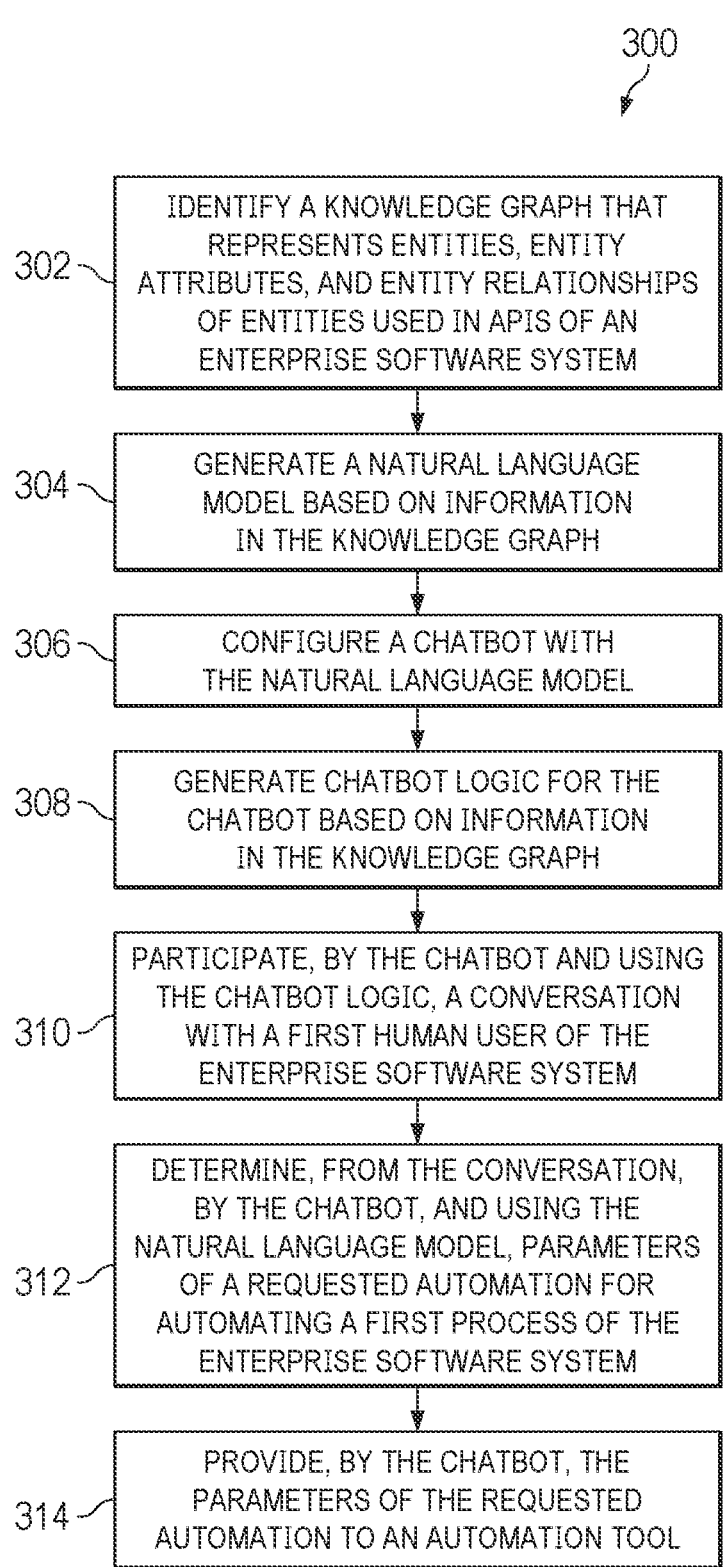

300

302 — IDENTIFY A KNOWLEDGE GRAPH THAT REPRESENTS ENTITIES, ENTITY ATTRIBUTES, AND ENTITY RELATIONSHIPS OF ENTITIES USED IN APIS OF AN ENTERPRISE SOFTWARE SYSTEM

304 — GENERATE A NATURAL LANGUAGE MODEL BASED ON INFORMATION IN THE KNOWLEDGE GRAPH

306 — CONFIGURE A CHATBOT WITH THE NATURAL LANGUAGE MODEL

308 — GENERATE CHATBOT LOGIC FOR THE CHATBOT BASED ON INFORMATION IN THE KNOWLEDGE GRAPH

310 — PARTICIPATE, BY THE CHATBOT AND USING THE CHATBOT LOGIC, A CONVERSATION WITH A FIRST HUMAN USER OF THE ENTERPRISE SOFTWARE SYSTEM

312 — DETERMINE, FROM THE CONVERSATION, BY THE CHATBOT, AND USING THE NATURAL LANGUAGE MODEL, PARAMETERS OF A REQUESTED AUTOMATION FOR AUTOMATING A FIRST PROCESS OF THE ENTERPRISE SOFTWARE SYSTEM

314 — PROVIDE, BY THE CHATBOT, THE PARAMETERS OF THE REQUESTED AUTOMATION TO AN AUTOMATION TOOL

FIG. 3

SCALABLE CONVERSATIONAL EXPERIENCE FOR CITIZEN DEVELOPERS FOR BUILD AUTOMATION GENERATION

BACKGROUND

A build automation tool can enable automation of enterprise workflows and processes. A customer of enterprise software can, for example, use the build automation tool to create automated workflows that involve various types of enterprise data and enterprise processes that involve various types of enterprise applications. Workflows can include automated document processing and automated transformation and transfer of data between systems, for example. Execution of automated workflows can involve invocation of various APIs (Application Programming Interfaces) provided by the various types of enterprise applications.

In some cases, a build automation tool can be used by a citizen developer, which is an employee that may develop lines of business applications or solutions using no-code or low-code solutions, rather than performing significant detailed software coding, as may be performed by software developers. Citizen developers may be, for example, project managers, key users, or other non-programmer stakeholders.

SUMMARY

The present disclosure describes providing a scalable conversational experience for citizen developers for build automation generation.

In an implementation, a computer-implemented method, comprises: identifying a knowledge graph that represents entities, entity attributes, and entity relationships of entities used in application programming interfaces (APIs) of an enterprise software system; generating a natural language model based on information in the knowledge graph; configuring a chatbot with the natural language model, wherein the chatbot is configured to generate automations for automating enterprise processes in the enterprise software system; generating chatbot logic for the chatbot based on information in the knowledge graph; participating, by the chatbot and using the chatbot logic, a conversation with a first human user of the enterprise software system; determining, from the conversation, by the chatbot, and using the natural language model, parameters of a requested automation for automating a first process of the enterprise software system; and providing, by the chatbot, the parameters of the requested automation to an automation tool.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a citizen developer can use natural language to describe automation processes to create, by verbally walking through intentions using a chatbot. Second, use of the chatbot can simplify creation of build automations, thereby increasing adoption by citizen developers of a build automation tool. Third, simplifying creation of build automations using a chatbot increases usability of the build automation tool. Fourth, a number of workflows supported for automation creation using conversational interactions can be substantially increased without requiring manual hardcoding or manual configuration of a chatbot. Fifth, conversational experiences for workflow automation creation support can efficiently scale to a large number of supported workflows, as compared to manual chatbot configuration. Sixth, use of a chatbot for build automation creation can help citizen developers learn and understand entities and entity relationships that might be relevant for build automations. Seventh, trained models used for conversational experiences for build automation creation can be enhanced with customer-specific master data.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 3 is a flowchart illustrating an example of a computer-implemented method for providing a scalable conversational experience for citizen developers for build automation generation, according to an implementation of the present disclosure.

Like reference numbers and designations in the various drawings indicate like elements.

DETAILED DESCRIPTION

Figure 1A:
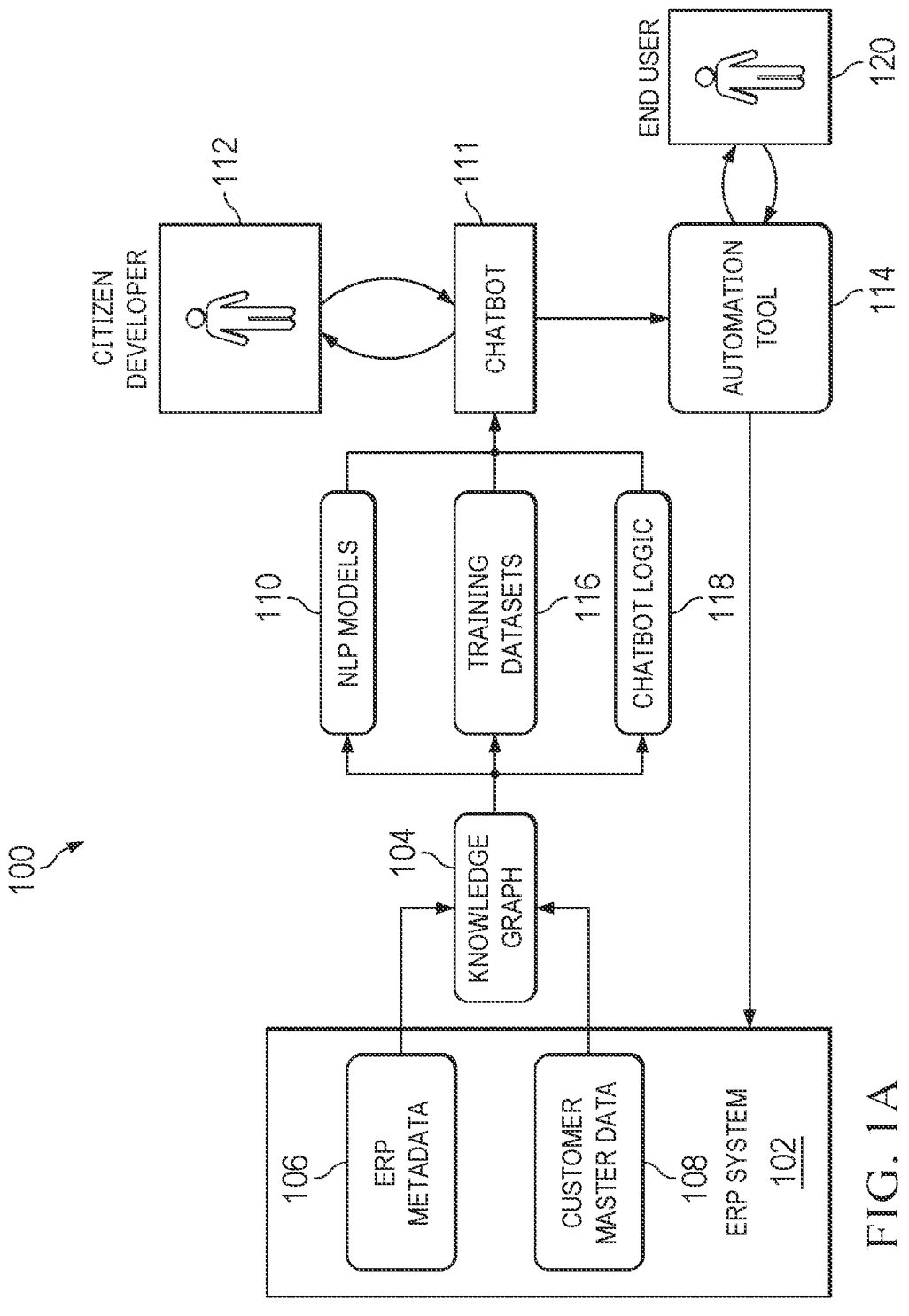
FIG. 1A illustrates a system for a conversational interface for build automations for enterprise software, according to an implementation of the present disclosure.

The following detailed description describes providing a scalable conversational experience for citizen developers for build automation generation and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A build automation tool can allow customers of enterprise software to construct automations to automate processes such as ERP (Enterprise Resource Planning) or other enterprise workflows that leverage one or more APIs of the enterprise software. However, to develop an automation on top of enterprise API(s) can be difficult, especially for non-programmer-developer users such as citizen developers, since the API(s) can be complex with many options that can involve many different types of entities. Additionally, the build automation tool itself can have a substantial learning curve.

Based on such challenges of learning curves for enterprise software interfaces and entities and the build automation tool, citizen developers can benefit by receiving system help for developing automations for the enterprise software, such as from a conversational interface provided by a chatbot. However, providing a chatbot that understands creation of automations for the full enterprise API(s) and possible workflows can be a resource-intensive, tedious, and error-prone process. Particularly, chatbot logic and NLP (Natural Language Programming) models may need to be configured so that the chatbot can converse and interact for build automation creation. For instance, chatbot logic may need to be configured so that conversation behavior of the chatbot matches the extensive API. As another example, NLP models may need to be trained to understand the conversation of the user for each workflow the user may wish to create. Particularly, each type of workflow may require a training dataset that includes a significant sample of labeled natural language interactions.

Hard-coding that involves manual creation of chatbot logic and training datasets for each desired workflow can be very resource-intensive and impractical, given a number of potential workflow options involving a large set of entities available in the enterprise software. Each time a new workflow is desired to be supported, additional manual configuration and hard coding may be required. Additionally, manual configurations and hard-codings may break if API(s) or entity specifications change over time.

To solve these and other challenges, the solution described herein can be used to create scalable conversational experiences for build automation creation for enterprise workflows. For example, the solution can enable a citizen developer (e.g., a developer without deep coding knowledge) to participate in conversational interactions with a chatbot to create automations for ERP systems. The solution uses a pattern-based approach to generate chatbot logic and NLP training datasets for different uses cases and workflows for creating enterprise automations. Such approaches can enable generation of support for conversational interaction for all enterprise entities and workflows, without requiring manual hardcoding or configuration, thereby saving resources and making more workflows available for inclusion in build automations using conversational interfaces than would otherwise be practical or possible.

Turning to FIG. 1A, FIG. 1A illustrates a system 100 for a conversational interface for build automations for enterprise software, according to an implementation of the present disclosure. The system 100 includes an ERP system 102. Although ERP system 102 is described, the system 100 can include, additionally or alternatively, other types of backend enterprise systems. The ERP system 102 can include or be associated with various types of applications, such as financial applications, human resource applications, customer resource management applications, and many others. The ERP system 102 can offer various APIs for interacting with the various applications included in or provided by the ERP system 102.

As part of providing a conversational interface for a customer of the ERP system 102, a knowledge graph 104 can be created from data in the ERP system 102. For example, the knowledge graph 104 can be created from ERP metadata 106 and customer master data 108 stored for the customer of the ERP system 102. The ERP system 102 can manage each customer of the ERP system 102 as a separate tenant, for example.

The ERP metadata 106 can include API information for APIs of applications of the ERP system 102. The APIs can be or include OData (Open Data Protocol) APIs, for example, and the API information can be OData API information. A knowledge graph generator can generate the knowledge graph 104, in part, by introspecting the API information, to identify entities, entity relationships, entity attributes, attribute value options, and other information. For example, by analyzing the API information, the knowledge graph generator can determine that a Purchase Requisition entity is used in the ERP system 102, that a Plant is a subclass of the Purchase Requisition entity, that Plant-Name is an attribute of Plant, and that other attributes may have a value from an enumerated collection of possible values. The knowledge graph 104 can be an ontology that represents discovered entities, attributes, attribute properties (e.g., required or optional, allowed values), and entity relationships, for entities that are involved in various workflows and use cases in the ERP system 102. In some implementations, the knowledge graph 104 is represented as an OWL (Web Ontology Language) ontology.

Figure 1B:
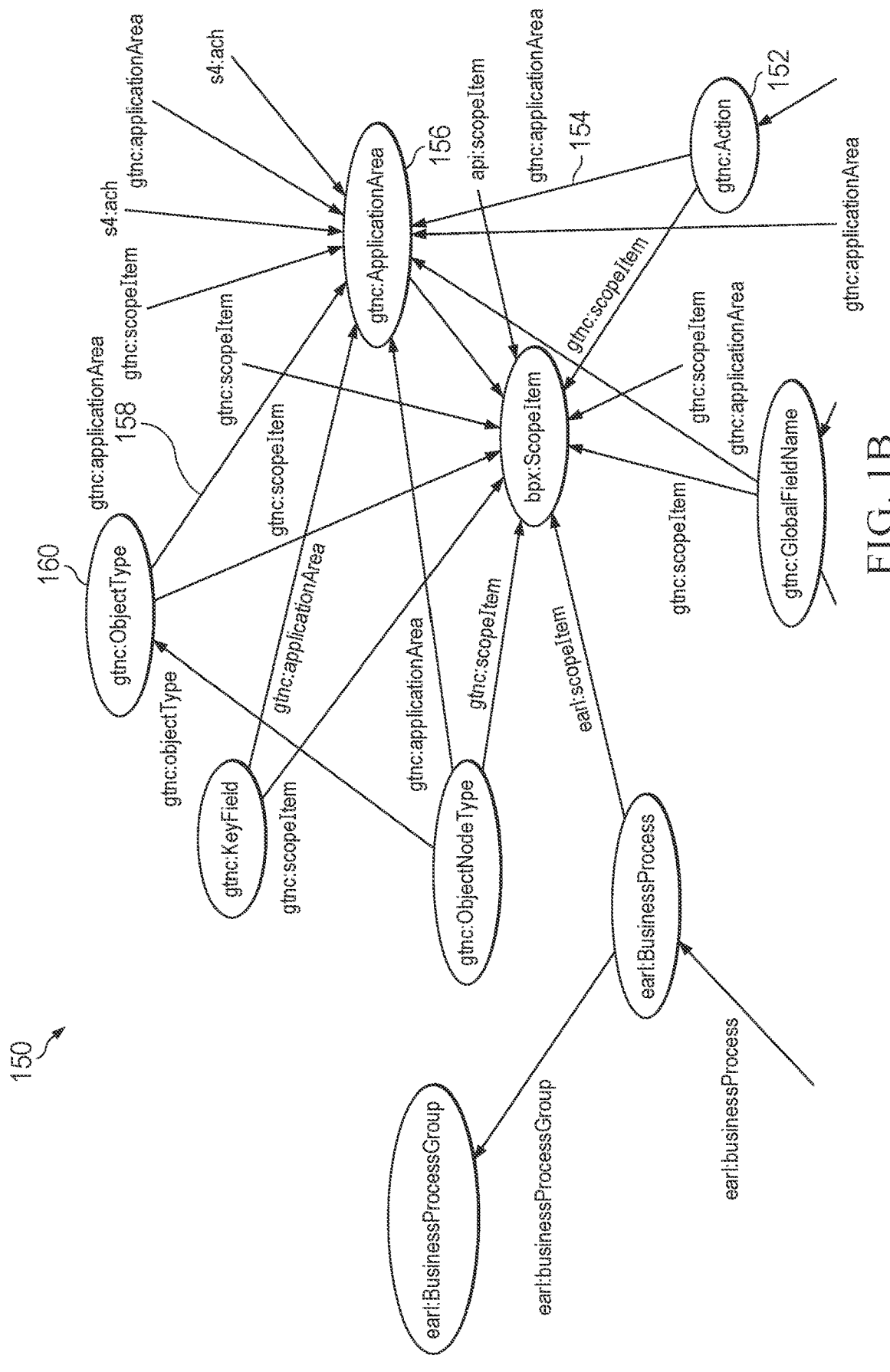
FIG. 1B is a portion of an example ontology, according to an implementation of the present disclosure.

Turning to FIG. 1B, FIG. 1B is a portion 150 of an example ontology, according to an implementation of the present disclosure. The example ontology can include nodes that represent entities and edges between nodes that represent entity relationships. For instance, the example ontology includes a node 152 representing an Action entity. An edge 154 indicates that the Action entity is related to an ApplicationArea entity that is represented by a node 156. An edge 158 indicates that the ApplicationArea entity is related to an ObjectType entity that is represented by a node 160.

Returning to FIG. 1A, the knowledge graph 104 can be enhanced for a given customer using customer master data 108. For example, the customer master data 108 can be queried, e.g., using a master data API of the ERP system 102, to obtain, for example, information for entity instances that are stored for the customer. For example, the ERP metadata 106 can indicate that a Plant entity has a Plant-Name attribute, and customer metadata for current Plant entity instances, having, for instance, Plant-Name values of "plant1", "plant2", "plant3", etc., can be obtained and added to the knowledge graph 104. Accordingly, specific plant names can be recognized during conversational interactions. In general, the incorporation of the customer master data 108 into the knowledge graph 104 can allow for tailored chatbot interaction specific to the context of the customer.

Information from the knowledge graph 104 can be used to create NLP models 110. The NLP models 110 can used in a chatbot 111 and can be trained to understand the conversation of a citizen developer 112 when the citizen developer 112 uses the chatbot 111 to create automations for workflows using an automation tool 114. The NLP models 110 can be trained using training datasets 116 that are based on knowledge graph 104 information.

The training datasets 116 can include samples of natural language interaction, representing different intents (e.g., creation, reading, updating, and deletion) with respect to different entities. The training datasets 116, therefore, can be used to train intention classification portions of the NLP models 110. The training datasets 116 can be generated based on patterns. For instance, interactions for creating an automation can generally often follow stereotypical patterns, and such patterns can be captured in the knowledge graph 104. For example, the knowledge graph 104 can be enhanced to include a class CRUDAction with subclasses for Create/Creation, Read/Reading, Update/Updating, and Delete/Deletion.

Additionally, for every entity in the knowledge graph, an annotation can be added to label the entity with a natural language expression, which can be, for example, a RDFS (Resource Description Framework Schema) label that provides human readable text for the entity. After such enhancements to the knowledge graph 104, the stereotypical nature of conversation interactions for automation creation can be leveraged to generate the training datasets 116 from the knowledge graph 104 using the natural language labels and pattern(s). Patterns can represent stereotypical interactions and can include variable placeholders that are expanded. For instance, in some implementations, an example pattern can be:

$CRUDAction a $Entity
$Entity to be $CRUDAction
please make an automation for $Entity $CRUDAction
$CRUDAction a $Entity automation.

The training datasets 116 can be generated by replacing $CRUDAction with respective subclasses of $CRUDAction (e.g., Create, Read, Update, and Delete) and for each concrete subclass, each NLP label of each entity in the knowledge graph. For example, the knowledge graph 104 may include PurchaseRequisition and PurchaseOrder entities, with NLP labels of "Purchase Requisition" and "Purchase Order", respectively. The "$CRUDAction a $Entity" pattern can be expanded to the following NLP samples:

Create a Purchase Requisition
Create a Purchase Order
Read a Purchase Requisition
Read a Purchase Order
Update a Purchase Requisition
Update a Purchase Order
Delete a Purchase Requisition
Delete a Purchase Order.

The other patterns can be similarly expanded, to complete generation of the training datasets 116.

In addition to generation of the NLP models 110 and training datasets 116, the knowledge graph 104 can be used to generate chatbot logic configurations (e.g., "chatbot logic" 118) for the chatbot 111. The chatbot logic 118 can implement conversational guideline behavior for the chatbot 111 for creating automations based on the ERP metadata 106 and the customer master data 108 included in the knowledge graph 104. For instance, chatbot logic 118 can include generation of chatbot behavior that can prompt a user for entity attribute values (e.g., plant name for creation of a Plant subclass during Purchase Requisition creation), select from a list of entity instances (e.g., "plant1", "plant2", "plant3") when a selection of a plant instance is required.

Once configured, and through use of the trained NLP models 110, the chatbot 111 can recognize action intent (e.g., create, update, read, delete) and requested entity type and entity instance, during conversations with the citizen developer 112. For instance, the chatbot 111 can recognize requests for creation of Purchase Requisition entities and mentions of specific Plant instances. The citizen developer

112 can, for example, ask the chatbot 111 to create an automation that as part of its processing creates a purchase requisition (e.g., using input data obtained during the automation).

The citizen developer 112 generally has knowledge of abstract entity types used in processes for which the citizen developer 112 has responsibility. The chatbot 111 is configured to have knowledge of corresponding technical entities, their attributes and their relationships, and their use in enterprise APIs. Accordingly, the chatbot 111 can intelligently prompt the citizen developer 112 for information (e.g., attribute values, field values, options for entity/attribute creation) that may be needed during actions performed on such entities during build automations. Accordingly, the chatbot 111 can help the citizen developer 112 learn and understand technical entities and entity relationships that might be relevant for build automations desired by the citizen developer 112.

The chatbot 111 can interface with the automation tool 114 to create automations, based on information obtained during conversational interactions with the citizen developer 112. The created automations can be deployed, for use by an end user 120. During automation execution, actions (e.g., creations, reads, updates, and deletions) can be performed on entities in the ERP system 102.

Figure 2:
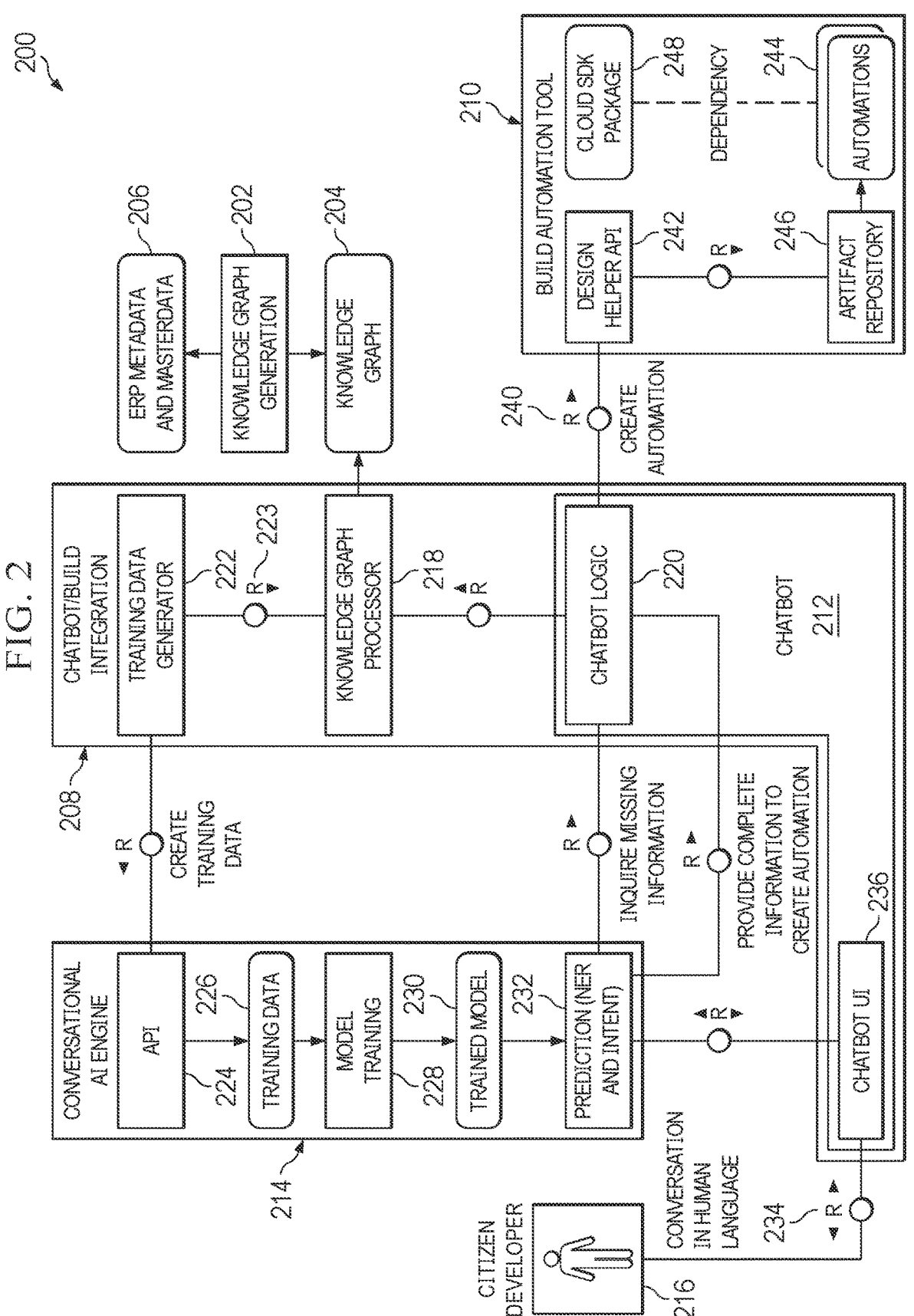
FIG. 2 illustrates another system that shows additional details for a conversational interface for build automations for enterprise software, according to an implementation of the present disclosure.

Turning to FIG. 2, FIG. 2 illustrates another system 200 that shows additional details for a conversational interface for build automations for enterprise software, according to an implementation of the present disclosure. Similar to the creation of the knowledge graph 104 previously described with respect to FIG. 1, a knowledge graph creation engine 202 can generate a knowledge graph 204, from ERP metadata and master data 206. A chatbot/build integration tool 208 can integrate a build automation tool 210 with a chatbot 212 and a conversational AI (Artificial Intelligence) engine 214, for providing support for conversational interactions between the chatbot 212 and a citizen developer 216, for creation of build automations.

In further detail, a knowledge graph processor 218 can generate chatbot logic 220 for the chatbot 212, for instance as described previously with respect to creation of the chatbot logic 118. For example, the knowledge graph processor 218 can extract, from the knowledge graph 204, information for logical operation of the chatbot 212, such as for prompting the citizen developer 216 for mandatory and optional entity attributes related to a purchase requisition. For example, assuming "Factory" is a mandatory attribute of a purchase requisition (e.g., as indicated in the knowledge graph 204), logical chatbot configurations (e.g., "chatbot logic") that can be used to prompt the citizen developer 216 for a Factory name and to validate a provided answer can be generated by the knowledge graph processor 218, as the chatbot logic 220, for operation of the chatbot 212.

Additionally, a training data generator 222 of the chatbot/build integration tool 208 can send a request 223 to the knowledge graph processor 218 to generate training data sets, for instance as described previously with respect to generation of the training datasets 116. The knowledge graph processor 218 can generate or identify patterns based on information in the knowledge graph 204 and provide the patterns to the training data generator 222. The training data generator 222 can generate training data sets based on the patterns.

The training data generator 222 can invoke one or more APIs 224 of the conversational AI engine 214 to create training data 226 for use in the conversational AI engine 214, based on the training data sets generated by the training data generator 222. The training data 226 can include and/or be based on training data sets provided by the training data generator 222 to the conversational AI engine 214, for example. A model training engine 228 can use the training data 226 to create a trained model 230.

The trained model 230 can be used by the chatbot 212 for prediction and recognition 232 (e.g., NER (Named Entity Recognition), intent recognition), during conversational interactions with the citizen developer 216. For example, the citizen developer 216 can participate in a conversation 234 in natural (e.g., human) language with a chatbot UI (User Interface) 236 of the chatbot 212. The chatbot 212 can, after obtaining information from the citizen developer 216 during the conversation 234, send a request 240 to the build automation tool 210, such as by invoking a design helper API 242 of the build automation tool 210. The build automation tool 210 can create automation(s) 244, based on information in the request 240, and store created automations in an artifact repository 246. Automations 244 can be instantiated and used at runtime for end users, such as in response to calls from APIs of the build automation tool 210 that are provided in or by a cloud SDK (Software Development Kit) 248.

Turning to FIG. 3, FIG. 3 is a flowchart illustrating an example of a computer-implemented method 300 for providing a scalable conversational experience for citizen developers for build automation generation, according to an implementation of the present disclosure. For clarity of presentation, the description that follows generally describes method 300 in the context of the other figures in this description, such as FIG. 2. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, a knowledge graph is identified that represents entities, entity attributes, and entity relationships of entities used in APIs of an enterprise software system. For example, the knowledge graph processor 218 can identify and access the knowledge graph 204. The knowledge graph can be created from API metadata of the APIs. The knowledge graph can be enhanced with customer metadata regarding information about entity instances in a customer landscape of a customer of the enterprise software system. From 302, method 300 proceeds to 304.

At 304, a natural language model is generated based on information in the knowledge graph. For instance, the model training engine 228 of FIG. 2 can generate the trained model 230. The NLP model can be trained using training data sets generated from the knowledge graph. For instance, the knowledge graph processor 218 can identify patterns in the knowledge graph and the training data generator 22 can generate training data sets based on the patterns and provide the training data sets to the model training engine 228. From 304, method 300 proceeds to 306.

At 306, a chatbot is configured with the natural language model. For example, the conversational AI engine 214 can configure the chatbot 212 using the trained model 230. The chatbot can be used to generate automations for automating enterprise processes in the enterprise software system. For example, the chatbot 212 can interface with the build automation tool 210 for creating automations. From 306, method 300 proceeds to 308.

At 308, chatbot logic is generated for the chatbot based on information in the knowledge graph. For instance, the knowledge graph processor 218 can generate the chatbot logic 220 that is used in the chatbot 212. From 308, method 300 proceeds to 310.

At 310, the chatbot participates, using the chatbot logic, in a conversation with a first human user of the enterprise software system. For instance, the chatbot 212 can provide the chatbot UI 236 to enable conversations with the citizen developer 216. The first human user can be a citizen developer. From 310, method 300 proceeds to 312.

At 312, the chatbot determines, from the conversation, using the natural language model, parameters of a requested automation for automating a first process of the enterprise software system. For example, the chatbot 212 can determine, from a conversation with the citizen developer 216, parameters for an automation requested by the citizen developer 216 using the chatbot UI 236. The chatbot can, for example, recognize a first entity type, a first entity instance, or an action to perform on an entity instance. As another example, the chatbot can prompt the second user for attribute values of an entity. From 312, method 300 proceeds to 314.

At 314, the chatbot provides the parameters of the requested automation to an automation tool. For example, the chatbot 212 can provide automation parameters to the build automation tool 210. The automation tool can create the requested automation using the parameters of the requested automation provided by the chatbot. An instance of the requested automation can be used by a second human user of the enterprise software system to automate the first process of the enterprise software system. The second user can be an end user. After 314, method 300 can stop.

Figure 4:
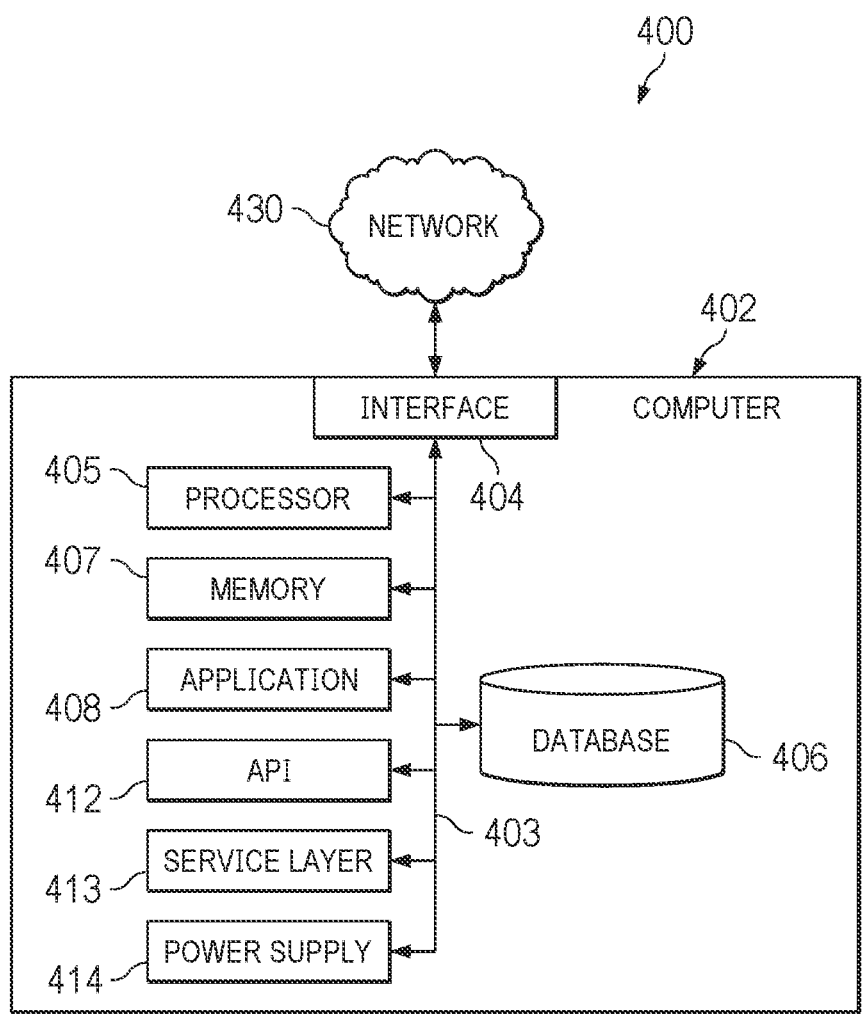
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud-computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (e.g., from a client software application executing on another Computer 402) and respond to the received requests by processing the received requests using a software application or a combination of software applications. In addition, requests can also be sent to the Computer 402 from internal users (e.g., from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (e.g., extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (e.g., a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. The Database 406 can hold and operate on at least any data type mentioned or any data type consistent with this disclosure.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (e.g., a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer implemented method comprises: identifying a knowledge graph that represents entities, entity attributes, and entity relationships of entities used in application programming interfaces (APIs) of an enterprise software system; generating a natural language model based on information in the knowledge graph; configuring a chatbot with the natural language model, wherein the chatbot is configured to generate automations for automating enterprise processes in the enterprise software system; generating chatbot logic for the chatbot based on information in the knowledge graph; participating, by the chatbot and using the chatbot logic, a conversation with a first human user of the enterprise software system; determining, from the conversation, by the chatbot, and using the natural language model, parameters of a requested automation for automating a first process of the enterprise software system; and providing, by the chatbot, the parameters of the requested automation to an automation tool.

The foregoing and other described implementations can each, optionally, include one or more of the following features:

A first feature, combinable with any of the following features, wherein the knowledge graph is enhanced with customer metadata regarding information about entity instances in a customer landscape of a customer of the enterprise software system.

A second feature, combinable with any of the preceding or following features, wherein the knowledge graph is created from API metadata of the APIs.

A third feature, combinable with any of the preceding or following features, wherein the automation tool creates the requested automation using the parameters of the requested automation provided by the chatbot.

A fourth feature, combinable with any of the preceding or following features, wherein an instance of the requested automation is used by a second human user of the enterprise software system to automate the first process of the enterprise software system.

A fifth feature, combinable with any of the preceding or following features, wherein identifying, from the conversation, parameters of the requested automation comprises recognizing a first entity type.

A sixth feature, combinable with any of the preceding or following features, wherein identifying, from the conversation, parameters of the requested automation comprises recognizing a first action to perform for the first entity type.

A seventh feature, combinable with any of the preceding or following features, wherein the first action comprises creation, reading, updating, or deleting.

An eighth feature, combinable with any of the preceding or following features, wherein participating in the conversation comprises prompting the first human user for one or more attribute values of the first entity type.

A ninth feature, combinable with any of the preceding or following features, wherein identifying, from the conversation, parameters of the requested automation comprises recognizing a first entity instance of the first entity type.

In a second implementation, a computer-implemented system, comprises one or more computers and one or more computer memory devices interoperably coupled with the one or more computers and having tangible, non-transitory, machine-readable media storing one or more instructions that, when executed by the one or more computers, perform one or more operations comprising: identifying a knowledge graph that represents entities, entity attributes, and entity relationships of entities used in application programming interfaces (APIs) of an enterprise software system; generating a natural language model based on information in the knowledge graph; configuring a chatbot with the natural language model, wherein the chatbot is configured to generate automations for automating enterprise processes in the enterprise software system; generating chatbot logic for the chatbot based on information in the knowledge graph; participating, by the chatbot and using the chatbot logic, a conversation with a first human user of the enterprise software system; determining, from the conversation, by the chatbot, and using the natural language model, parameters of a requested automation for automating a first process of the enterprise software system; and providing, by the chatbot, the parameters of the requested automation to an automation tool.

The foregoing and other described implementations can each, optionally, include one or more of the following features:

A first feature, combinable with any of the following features, wherein the knowledge graph is enhanced with customer metadata regarding information about entity instances in a customer landscape of a customer of the enterprise software system.

A second feature, combinable with any of the preceding or following features, wherein the knowledge graph is created from API metadata of the APIs.

A third feature, combinable with any of the preceding or following features, wherein the automation tool creates the requested automation using the parameters of the requested automation provided by the chatbot.

A fourth feature, combinable with any of the preceding or following features, wherein an instance of the requested automation is used by a second human user of the enterprise software system to automate the first process of the enterprise software system.

A fifth feature, combinable with any of the preceding or following features, wherein identifying, from the conversation, parameters of the requested automation comprises recognizing a first entity type.

A sixth feature, combinable with any of the preceding or following features, wherein identifying, from the conversation, parameters of the requested automation comprises recognizing a first action to perform for the first entity type.

A seventh feature, combinable with any of the preceding or following features, wherein the first action comprises creation, reading, updating, or deleting.

An eighth feature, combinable with any of the preceding or following features, wherein participating in the conversation comprises prompting the first human user for one or more attribute values of the first entity type.

A ninth feature, combinable with any of the preceding or following features, wherein identifying, from the conversation, parameters of the requested automation comprises recognizing a first entity instance of the first entity type.

In a third implementation, a non-transitory, computer-readable medium stores one or more instructions executable by a computer system to perform operations comprising: identifying a knowledge graph that represents entities, entity attributes, and entity relationships of entities used in application programming interfaces (APIs) of an enterprise software system; generating a natural language model based on information in the knowledge graph; configuring a chatbot with the natural language model, wherein the chatbot is configured to generate automations for automating enterprise processes in the enterprise software system; generating chatbot logic for the chatbot based on information in the knowledge graph; participating, by the chatbot and using the chatbot logic, a conversation with a first human user of the enterprise software system; determining, from the conversation, by the chatbot, and using the natural language model, parameters of a requested automation for automating a first process of the enterprise software system; and providing, by the chatbot, the parameters of the requested automation to an automation tool.

The foregoing and other described implementations can each, optionally, include one or more of the following features:

A first feature, combinable with any of the following features, wherein the knowledge graph is enhanced with customer metadata regarding information about entity instances in a customer landscape of a customer of the enterprise software system.

A second feature, combinable with any of the preceding or following features, wherein the knowledge graph is created from API metadata of the APIs.

A third feature, combinable with any of the preceding or following features, wherein the automation tool creates the requested automation using the parameters of the requested automation provided by the chatbot.

A fourth feature, combinable with any of the preceding or following features, wherein an instance of the requested automation is used by a second human user of the enterprise software system to automate the first process of the enterprise software system.

A fifth feature, combinable with any of the preceding or following features, wherein identifying, from the conversation, parameters of the requested automation comprises recognizing a first entity type.

A sixth feature, combinable with any of the preceding or following features, wherein identifying, from the conversation, parameters of the requested automation comprises recognizing a first action to perform for the first entity type.

A seventh feature, combinable with any of the preceding or following features, wherein the first action comprises creation, reading, updating, or deleting.

An eighth feature, combinable with any of the preceding or following features, wherein participating in the conversation comprises prompting the first human user for one or more attribute values of the first entity type.

A ninth feature, combinable with any of the preceding or following features, wherein identifying, from the conversation, parameters of the requested automation comprises recognizing a first entity instance of the first entity type.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices.

Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EE-PROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input.

In addition, a computer can interact with the user by sending documents to and receiving documents from a client computing device that is used by the user (e.g., by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:

identifying a knowledge graph that represents entities, entity attributes, and entity relationships of entities used in application programming interfaces (APIs) of an enterprise software system;

generating a natural language model based on information in the knowledge graph, wherein the natural language model is trained using training data sets generated from the knowledge graph based on identified patterns in the knowledge graph, wherein the identified patterns include variable placeholders representing actions and entities, and wherein generating the training data sets comprises expanding the identified patterns by replacing the variable placeholders with natural language labels of the entities defined in the knowledge graph;

configuring a chatbot with the natural language model, wherein the chatbot is configured to generate automations for automating enterprise processes in the enterprise software system;

generating chatbot logic for the chatbot based on information in the knowledge graph;

participating, by the chatbot and using the chatbot logic, a conversation with a first human user of the enterprise software system;

determining, from the conversation, by the chatbot, and using the natural language model, parameters of a requested automation for automating a first process of the enterprise software system; and providing, by the chatbot, the parameters of the requested automation to an automation tool.

2. The computer-implemented method of claim 1, wherein the knowledge graph is enhanced with customer metadata regarding information about entity instances in a customer landscape of a customer of the enterprise software system.

3. The computer-implemented method of claim 1, wherein the knowledge graph is created from API metadata of the APIs.

4. The computer-implemented method of claim 1, wherein the automation tool creates the requested automation using the parameters of the requested automation provided by the chatbot.

5. The computer-implemented method of claim 1, wherein an instance of the requested automation is used by a second human user of the enterprise software system to automate the first process of the enterprise software system.

6. The computer-implemented method of claim 1, wherein identifying, from the conversation, parameters of the requested automation comprises recognizing a first entity type.

7. The computer-implemented method of claim 6, wherein identifying, from the conversation, parameters of the requested automation comprises recognizing a first action to perform for the first entity type.

8. The computer-implemented method of claim 7, wherein the first action comprises creation, reading, updating, or deleting.

9. The computer-implemented method of claim 6, wherein participating in the conversation comprises prompting the first human user for one or more attribute values of the first entity type.

10. The computer-implemented method of claim 6, wherein identifying, from the conversation, parameters of the requested automation comprises recognizing a first entity instance of the first entity type.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

identifying a knowledge graph that represents entities, entity attributes, and entity relationships of entities used in application programming interfaces (APIs) of an enterprise software system;

generating a natural language model based on information in the knowledge graph, wherein the natural language model is trained using training data sets generated from the knowledge graph based on identified patterns in the knowledge graph, wherein the identified patterns include variable placeholders representing actions and entities, and wherein generating the training data sets comprises expanding the identified patterns by replacing the variable placeholders with natural language labels of the entities defined in the knowledge graph;

configuring a chatbot with the natural language model, wherein the chatbot is configured to generate automations for automating enterprise processes in the enterprise software system;

generating chatbot logic for the chatbot based on information in the knowledge graph;

participating, by the chatbot and using the chatbot logic, a conversation with a first human user of the enterprise software system;

determining, from the conversation, by the chatbot, and using the natural language model, parameters of a requested automation for automating a first process of the enterprise software system; and providing, by the chatbot, the parameters of the requested automation to an automation tool.

12. The computer-implemented system of claim 11, wherein the knowledge graph is enhanced with customer metadata regarding information about entity instances in a customer landscape of a customer of the enterprise software system.

13. The computer-implemented system of claim 11, wherein the knowledge graph is created from API metadata of the APIs.

14. The computer-implemented system of claim 11, wherein the automation tool creates the requested automation using the parameters of the requested automation provided by the chatbot.

15. The computer-implemented system of claim 11, wherein an instance of the requested automation is used by a second human user of the enterprise software system to automate the first process of the enterprise software system.

16. A non-transitory computer-readable medium storing one or more instructions executable by a computer system to perform operations comprising:

identifying a knowledge graph that represents entities, entity attributes, and entity relationships of entities used in application programming interfaces (APIs) of an enterprise software system;

generating a natural language model based on information in the knowledge graph, wherein the natural language model is trained using training data sets generated from the knowledge graph based on identified patterns in the knowledge graph, wherein the identified patterns include variable placeholders representing actions and entities, and wherein generating the training data sets comprises expanding the identified patterns by replacing the variable placeholders with natural language labels of the entities defined in the knowledge graph;

configuring a chatbot with the natural language model, wherein the chatbot is configured to generate automations for automating enterprise processes in the enterprise software system;

generating chatbot logic for the chatbot based on information in the knowledge graph;

participating, by the chatbot and using the chatbot logic, a conversation with a first human user of the enterprise software system;

determining, from the conversation, by the chatbot, and using the natural language model, parameters of a requested automation for automating a first process of the enterprise software system; and providing, by the chatbot, the parameters of the requested automation to an automation tool.

17. The non-transitory computer-readable medium of claim 16, wherein the knowledge graph is enhanced with customer metadata regarding information about entity instances in a customer landscape of a customer of the enterprise software system.

18. The non-transitory computer-readable medium of claim 16, wherein the knowledge graph is created from API metadata of the APIs.

19. The non-transitory computer-readable medium of claim 16, wherein the automation tool creates the requested automation using the parameters of the requested automation provided by the chatbot.

20. The non-transitory computer-readable medium of claim 16, wherein an instance of the requested automation is used by a second human user of the enterprise software system to automate the first process of the enterprise software system.

* * * * *